(No Model.)
H. H. BOSTWICK.
GRATE FOR STOVES, RANGES, FURNACES, &c.
No. 371,246. Patented Oct. 11, 1887.
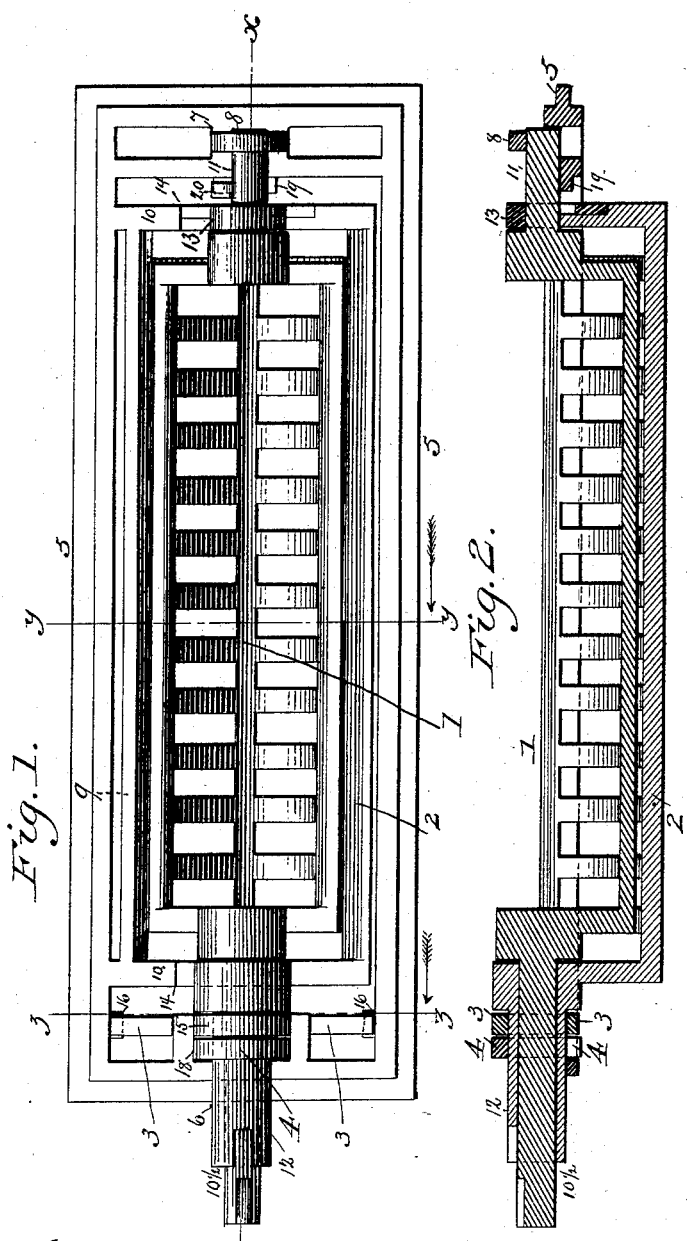

UNITED STATES PATENT OFFICE.

HENRY H. BOSTWICK, OF AUBURN, NEW YORK.

GRATE FOR STOVES, RANGES, FURNACES, &c.

SPECIFICATION forming part of Letters Patent No. 371,246, dated October 11, 1887.

Application filed August 7, 1886. Serial No. 210,349. (No model.)

*To all whom it may concern:*

Be it known that I, HENRY H. BOSTWICK, a citizen of the United States of America, residing at Auburn, in the county of Cayuga, in the State of New York, have invented a new and useful Stove-Grate, of which the following is a specification.

My invention has relation to improvements in rotary grates for stoves, ranges, and furnaces; and the object is to provide a grate consisting of two concentrically-disposed baskets hung one in the other and rotatable on a common axis, whereby the slag, cinders, and other refuse collected at the bottom of the fire may be more readily, thoroughly, and conveniently removed than by the grates of other constructions.

My invention consists in an outer rotary grate or basket and an inner rotary grate or basket set one within the other and arranged to rotate on a common axis independently of each other, as hereinafter will be more specifically stated.

My invention also consists in the novel construction of the parts and their combination, as will be more fully hereinafter described, and specially as the same is set forth in the claims.

I have fully illustrated my invention in the accompanying drawings, wherein—

Figure 1 is a top plan view of the grate and grate-frame. Fig. 2 is a longitudinal central section on the line $x\,x$ of Fig. 1. Fig. 3 is a transverse sectional view taken on the line $y\,y$ of Fig. 1; and Fig. 4 is a similar view taken on the line $z\,z$ of Fig. 1, showing the sliding bar in its seat, the U-shaped keeper arranged in its position being shown partly in dotted lines.

In the drawings, the same parts appearing in the different illustrations are designated by the same notations, and reference being thereto had, 5 designates the grate-frame. This consists of a frame formed with journal-bearings 6 and 7, which are oppositely arranged to receive the journals of the grate. The bearing 7, being the inner one, is provided with a keeper, 8, to prevent the journal of the grate from being thrown out of its place when the grates are being rotated or shaken. On one side of the grate-frame, arranged on the inner side of the frame-piece, is a stop, 9, which has inwardly-projecting lugs 10, the purpose being to prevent the outer grate from being rotated above these stops in that direction.

The numeral 1 designates the inner grate or basket, which may consist of a hemispherical, semi-cylindrical, or semi-cylindroidal shell formed with grate-bars. I have illustrated this grate as a grated semi-cylindrical shell with closed ends. From the rim of the inner grate are projected journals 10½ and 11, which have their bearings respectively in the journal-bearing 7 of the frame and in the sleeve of the outer grate, as shown.

The numeral 2 designates the outer shell of the grate, which in the general construction and conformation of the basket part is essentially the same with that of the inner part or shell. It is made larger to receive the inner grate and to permit rotation of one about the other freely. From the rim of grate 2 is projected a hollow journal, 12, in the bore of which the journal of the inner grate is fitted and rotates, and opposite the journal 12 on the rim of the outer grate is a ring-bearing, 13, through the hole of which the inner spindle of the inner grate passes. The outer grate is thus mounted to swing or rotate on the spindles or journals of the inner grate, and both grates are mounted to swing or rotate independently of each other and to rest in normal position one within the other under the fire-bed. The sleeve on the outer extended spindle of the outer grate is of such length as to be in convenient position for a shaker to be applied. To give the outer grate a horizontal position in cross-section when at rest in its intended normal position, the rim or closed ends which engage with the stops on the frame are cut away to the thickness of the stopping means, as seen at 14.

The numeral 3 designates a sliding bar or keeper, which is formed with a circular collar-bearing, 15, to take the bearing-sleeve of the outer grate, and is supported on lugs 16 on the frame, the lugs setting in notches 17 in the ends of the sliding bar. This sliding bar sets with its collar-bearing against an annular shoulder on the bearing-sleeve of the outer grate, and is kept in its seat by means of a U shaped washer, 18, interposed between the bar and the end piece of the frame.

On the inner bearing of the grate-frame is formed or secured a plate, 19, which serves as a rest for the stop-lug 20 on the axle on the inner grate. This stop-lug 20 also serves to indicate when the grate is turned back in its normal position in the outer grate.

I have illustrated my improvements as applied to semi-cylindrical grates; but it is apparent that the principle of operation is equally applicable to all constructions which admit of two grates being hung to turn on the same axis and set one within the other, and I therefore do not limit myself to the precise construction of oblong grates as shown.

From the description, and from reference to the drawings, it will be perceived that either of the grates may be rotated until its convex surface is upward and forced between the combustibles, with the refuse and consumed fuel beneath and in the grate not rotated. The grate thus thrown up supports the coal and other material, while the slag and ashes below in the other grate may be discharged by dumping that grate and then returning the dumped grate to its normal position. The grate which was first reversed and has been employed to sustain the fuel may then be turned back to its position and the fuel let down into the basket. By repeating these operations the whole contents of the combustion-chamber may be removed. If it is desired merely to shake out the ashes without dumping the grates, the inner grate may be rocked by the shaker-lever and the object will be accomplished.

What I claim is—

1. The combination, with a stationary frame formed with bearings, of an outer swinging and rotatable grate-section formed with bearings, and an inner swinging and rotatable grate section formed with journals to project through the bearings of the outer grate, said grates being arranged to swing and revolve concentrically one within the other on their journals in the bearings in the stationary frame, substantially as described.

2. The combination, with a stationary frame formed with bearings, of a smaller concave grate formed with journal-bearings, a larger concave grate formed with bearings to hang on the journals of the smaller grate, and said grates being arranged concentrically one within the other, mounted on the bearings on the frame, a sliding bar, 3, formed with a collar-bearing to take the bearing of the larger grate, and a detachable washer, 18, to hold the grates in their bearings and together on their common axis, substantially as described.

3. The combination, with a stationary frame formed with bearings and inwardly-projecting stops, of two concave grates or baskets arranged to hang concentrically one within the other on a common axis and to revolve one about the other in opposite directions on journals mounted in the frame and held in normal position below the fire-bed by the stops on the frame, substantially as described.

HENRY H. BOSTWICK.

Witnesses:
ORIN McCARTY,
B. M. WILCOX.